(12) United States Patent
Ahmed (10) Patent No.: US 8,347,093 B1
(45) Date of Patent: Jan. 1, 2013

(54) PRIVACY PRESERVING NAME VERIFICATION

(75) Inventor: Mohsin Ahmed, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 12/838,841

(22) Filed: Jul. 19, 2010

(51) Int. Cl.
*H04L 9/00* (2006.01)
*H04L 9/32* (2006.01)

(52) U.S. Cl. .................. 713/168; 713/170; 713/189

(58) Field of Classification Search .......... 713/168–170, 713/150, 155, 181, 189; 726/2–7, 10; 380/277, 380/282, 285
See application file for complete search history.

(56) References Cited

U.S. PATENT DOCUMENTS 6,957,330 B1 * 10/2005 Hughes .......................... 713/163
2003/0195858 A1 * 10/2003 Watanabe et al. ................ 705/75

OTHER PUBLICATIONS

"Knol: a unit of knowledge" [online]. [Retrieved Sep. 1, 2009]. Retrieved from the internet: <http://knol.google.com/k>, 4 pages.
"Google Knol—Quick Start Guide" [online]. Jul. 23, 2008. [Retrieved Jul. 19, 2010]. Retrieved from the internet: <http://www.labnol.org/internet/google-knol-getting-started-guide/3962/>, 2 pages.
"Google's Knol verifies you're a real person" [online], Jul. 26, 2008. [Retrieved Jul. 19, 2010]. Retrieved from the Internet <http://www.theinquirer.net/inquirer/news/1014060/google-knol-verifies-your-real-name>, 5 pages.
"Knol Verifies Your Google Account Identity"[online], Nov. 4, 2008. [Retrieved Sep 1, 2009]. Retrieved from the internet: <http://lifehacker.com/5076356/knol-verifies-your-google-account-identity>, 2 pages.
"Welcome to Knol"[online], Copyright 2009 [Retrieved Jul. 19, 2010]. <https://www.google.com/accounts/ServiceLogin?continue=https%3A%2F%...2Fsystem%2Fknol%2Fpages%2FSettings&passive=true&service=knol&hl=en>, 1 page.
"Knol Name Verification"[online], Copyright 2009 [Retrieved Sep. 1, 2009]. <https://knol.google.com/k/knol/system/knol/pages/verify/Ssn>, 1 page.

* cited by examiner

*Primary Examiner* — Hosuk Song
(74) *Attorney, Agent, or Firm* — Lerner, David, Littenberg, Krumholz & Mentlik, LLP (57) ABSTRACT

Aspects of the invention pertain to preserving the privacy of users in on-line systems while also enabling verification that the users are who they purport to be. Confidential personal information may be communicated from a user to a trusted third party via a web-based application or other service. However, the personal information is encrypted so that the application or service is unable to access it. The trusted third party accesses the personal information and uses it to verify that a user ID such as an email address is associated with a particular user. This information is provided to the web-based application or service to certify the identity of the user. As a result, the application or server verifies to other users that the certified user is who he/she purports to be.

17 Claims, 4 Drawing Sheets

PRIVACY PRESERVING NAME VERIFICATION

BACKGROUND OF THE INVENTION

1. Field of the Invention

The present invention relates generally to verifying a user's identity in web-based or on-line applications while preserving the user's privacy.

2. Description of Related Art

There are many different web-based applications and services that allow users to author and post content, as well as provide reviews and comments on such content. For instance, some encyclopedia-type services such as Google's Knol or Wikipedia allows users to author articles on various topics. And websites such as Amazon.com allow users to rate and review products that are offered for sale. Here, the users' reviews may themselves be ranked according to how helpful they are.

In this case, other users may rely on certain reviews not only because of the reviews themselves, but also because of who the reviewer is and rankings the reviewer has received. In some situations, the ranking may be low because of a lack of information about the reviewer.

Users often select screen names or user IDs when posting or reviewing content. This may be done for many reasons, including concerns about the users' privacy. Depending upon the application, the service provider may have some information concerning the user, such as credit card information. However, the user may not wish to share other personal information with the service provider. This limits the ability of the system to verify the identity of the user.

SUMMARY OF THE INVENTION

Aspects of the invention provide ways to verify the identity of users who post on-line content or feedback while maintaining the privacy of the users. This can increase the credibility and trustworthiness of the poster in the eyes of their readers. Other aspects employ privacy-preserving user verification in other applications and services.

In accordance with one embodiment of the invention, a method for maintaining user privacy in a verification system is provided. The method comprises receiving encrypted private data of a user from a client device; re-encrypting the encrypted private data with an encryption module using a public key of a trusted entity; sending the re-encrypted private data and selected user data to an ID verification module without logging personal information of the user; receiving validation from the ID verification module that the user has been verified; and storing the validation in a database so that actions taken by the user are indicated as being done by the user.

In one example, the method further comprises storing a hash of multiple pieces of user-related information in a secure database. The user-related information includes at one or more components of both the private data and the selected user data. In an alternative, the method further comprises receiving account information associated with the user; comparing the received account information with the hash in the secure database; and determining whether a new account can be created based upon the comparison. In this case, determining whether the new account can be created desirably includes determining whether multiple accounts are already associated with the account information. It is determined that the new account cannot be created if the multiple accounts exceed a threshold amount.

In another example, the method further comprises receiving a given action associated with the user; determining whether the user has been validated by evaluating the stored validation; and upon determining that the user has been validated, identifying to a third party that the given action is associated with the user. In an alternative, the third party is associated with a geographical area. The identifying to the third party includes presenting the given action of the user to the third party if the user is also associated with the geographical area. In one scenario, the user is a business entity and the given action is an advertisement, coupon or accolade for the business entity.

In another alternative, the user is a plurality of users, and the given action associated with each user includes information about a geographical area. In this case, the method further comprises ranking results from the users based on their respective relation to the geographical area. In a further alternative, the given action is a web posting and at least one component of the selected user data comprises a location of the user. And in yet another alternative, the identification is a validation mark presented on a display device.

In a further example, the selected user data includes a telephone number, and the method further comprises providing a PIN number to the user for creating a secure channel between the user and the trusted entity. The PIN is usable to confirm that the telephone number is associated with the user. In another example, the selected user data includes an address, and the method further comprises sending a PIN number to the user at the address for creating a secure channel between the user and the trusted entity. In this case, the PIN is usable to confirm that the address is associated with the user.

In another example, the method further comprises receiving an endorsement from a second user, the second user having received a separate validation from the ID verification module; and using the endorsement to verify an identify of the user. And in yet another example, the method further comprises receiving an endorsement from a second user, the second user having received a separate validation from the ID verification module; and using the endorsement to place content restrictions on information provided to the user.

In accordance with another embodiment, a system for maintaining user privacy in a network is provided. The system comprises receiver means for receiving encrypted private data of a user from a client device, a processor including an encryption module for re-encrypting the encrypted private data using a public key of a trusted entity, and a transmitter for sending the re-encrypted private data and selected user data to an ID verification module without logging personal information of the user. The processor is configured to receive validation from the ID verification module that the user has been verified and store the validation in a database so that actions taken by the user are indicated as being done by the user.

In one example, the processor is further configured to store a hash of multiple pieces of user-related information in a secure database. The user-related information includes at one or more components of both the private data and the selected user data. In this case, the processor may be further configured to: receive account information associated with the user; compare the received account information with the hash in the secure database; and determine whether a new account can be created based upon the comparison.

In another example, the processor is further configured to: receive a given action associated with the user; determine whether the user has been validated by evaluating the stored validation; and upon determining that the user has been validated, identify to a third party that the given action is associated with the user. In this case, the third party may be associated with a geographical area, and the identifying to the third party desirably includes presenting the given action of the user to the third party if the user is also associated with the geographical area.

In a further example, the selected user data includes a telephone number, and the system is configured to provide a PIN number to the user for creating a secure channel between the user and the trusted entity. The PIN is usable to confirm that the telephone number is associated with the user. In yet another example, the selected user data includes an address, and the system is configured to send a PIN number to the user at the address for creating a secure channel between the user and the trusted entity. Here, the PIN is usable to confirm that the address is associated with the user.

In another example, the processor is further configured to: receive an endorsement from a second user, the second user having received a separate validation from the ID verification module; and use the endorsement to verify an identity of the user. And in a further example, the processor is further configured to: receive an endorsement from a second user, the second user having received a separate validation from the ID verification module; and use the endorsement to place content restrictions on information provided to the user.

The aspects, features and advantages of the invention will be appreciated when considered with reference to the following description of embodiments and accompanying figures. The following description does not limit the present invention; rather, the scope of the invention is defined by the appended claims and equivalents.

DETAILED DESCRIPTION

While the Internet and other networks provide a fast and efficient means of communication, privacy and security are important concerns for many users. However, these concerns may be in conflict. For instance, a user such as a product reviewer may wish to keep his or her personal information (e.g., full name, address, age, etc.) private, while a service or website which hosts the product review may want to verify that the user is in fact a particular person and is not a competitor holding himself/herself out as being someone else.

Even if the user is who she says she is, she may be reluctant to verify her identity by providing her personal information to the service or website. According to aspects of the invention, the user's identity can be verified using trusted sources while maintaining user privacy.

Figure 1A:
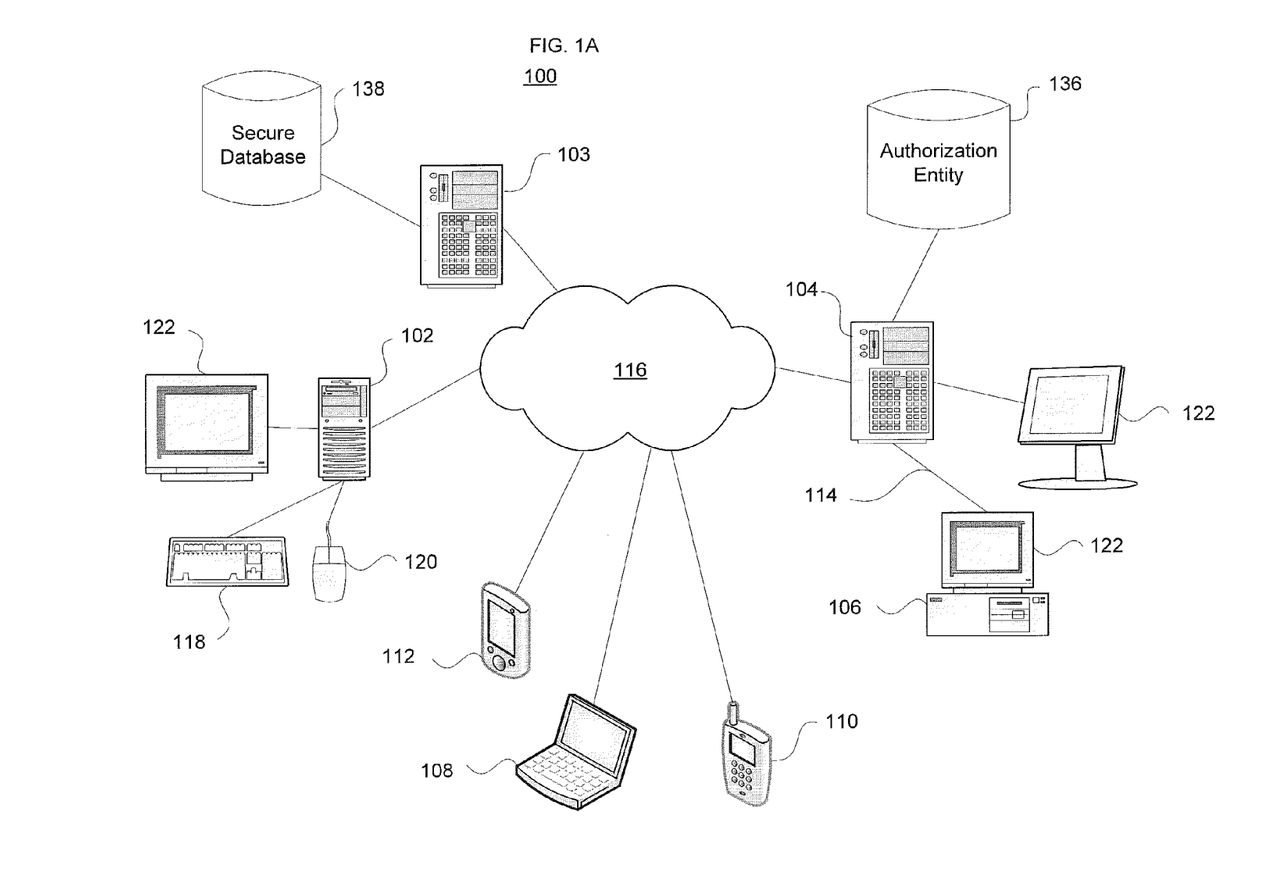
FIGS. 1A-B illustrates a system for use in accordance with aspects of the invention.
Figure 1B:
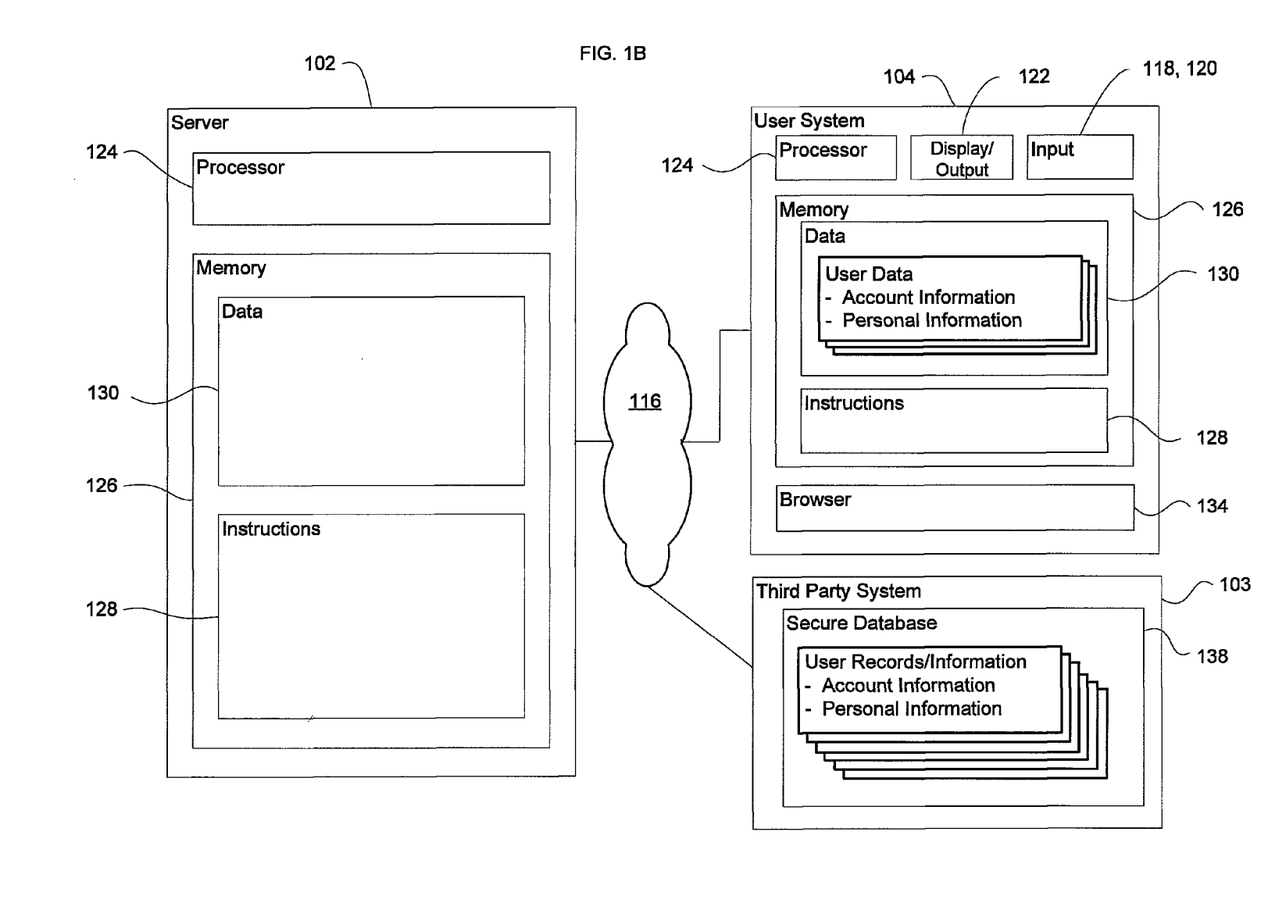

FIGS. 1A-B present schematic diagrams of an exemplary computer system depicting various computing devices that can be used alone or in a networked configuration in accordance with aspects of the present invention. For example, FIG. 1A illustrates a computer network 100 having a plurality of computers 102, 103, 104, 106 and 108 as well as other types of devices such as portable electronic devices such as a mobile phone 110 and a PDA 112. Such devices may be interconnected via a local or direct connection 114 and/or may be coupled via a communications network 116 such as a LAN, WAN, the Internet, etc. and which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, touch screen, TV, projector, etc. Each computer 102, 103, 104, 106 and 108 may be a personal computer, server, etc. By way of example only, computers 102 and 106 may be servers such as application servers, computer 104 may be a desktop personal computer, and computer 108 may be a laptop or palmtop computer.

As shown in FIG. 1B, each computer such as computers 102 and 104 contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor. The memory/storage may be of any type or any device capable of storing information accessible by the processor, such as a hard-drive, ROM, RAM, CD-ROM, flash memories, write-capable or read-only memories. The processor 124 may comprise any number of well known processors, such as processors from Intel Corporation or Advanced Micro Devices. Alternatively, the processor may be a dedicated controller for executing operations, such as an ASIC.

The instructions 128 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. The functions, methods and routines of instructions in accordance with aspects of the invention are explained in more detail below.

Data 130 may be retrieved, stored or modified by processor 124 in accordance with the instructions 128. The data may be stored as a collection of data. The data may be formatted in any computer readable format such as, but not limited to, binary values, ASCII or Unicode. Moreover, the data may include any information sufficient to identify the relevant information, such as descriptive text, proprietary codes, pointers, references to data stored in other memories (including other network locations) or information which is used by a function to calculate the relevant data.

Although the processor 124 and memory 126 are functionally illustrated in FIG. 1B as being within the same block, it will be understood that the processor and memory may actually comprise multiple processors and memories that may or may not be stored within the same physical housing or location. For example, some or all of the instructions and data may be stored on a removable CD-ROM, DVD or Blu-Ray disc and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives or the like.

In one aspect, server 102 may communicate with one or more client computers 104 and/or 108, as well as devices such as mobile phone 110 and PDA 112. Each client computer or other client device may be configured similarly to the server 104, with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

As shown in FIG. 1B, the data 130 of a client device such as computer 104 may include user data 132 such as account information or personal information. Depending on the application, some or all of the user data 132 may be shared, for instance using browser 134, with a remote application or service residing on a third party system 103, which may comprise an application server.

The servers, user computers and other devices are capable of direct and indirect communication with one another such as over network 116. Although only a few computing devices are depicted in FIGS. 1A-B, it should be appreciated that a typical system can include a large number of connected servers and clients, with each different computer being at a different node of the network. The network 116, and intervening nodes, may comprise various configurations and protocols including the Internet, intranets, virtual private networks, wide area networks and local networks that may use communication architectures and protocols such as Ethernet, WiFi, Bluetooth and/or TCP/IP.

Communication across the network, including any intervening nodes, may be facilitated by any device capable of transmitting data to and from other computers, such as modems (e.g., dial-up or cable), network interfaces and wireless interfaces. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers and user devices in accordance with the systems and methods described herein may comprise any device capable of processing instructions and transmitting data to and from humans and other computers, including network computers lacking local storage capability, PDA's with modems such as PDA 112 and Internet-capable wireless phones such as mobile phone 110. A device such as a wireless transceiver may operate on a cellular network, wireless LAN, ad-hoc Bluetooth arrangement or the like.

As shown in FIG. 1A, the network 100 may also include an authorization entity 136, which may be directly or indirectly coupled to server 102. In an alternative, the authorization entity 136 may be part of or otherwise logically associated with the server 102. Similarly, the application server of the third party system 103 may include a secure database 138. The secure database 138 may be part of the application server, or may be part of a distributed architecture such as a server farm or cloud computing environment.

In one scenario, a user may log into a website via a web browser. The login may be done for instance using his/her e-mail address or other identifier. The user's web browser authenticates the website using a secure socket layer ("SSL") certificate. Once logged in, the user can navigate to a secure page where they submit their private information, such as name, address and social security number. All of the user's private information may be encrypted by the browser using the website's SSL public key(s). The encrypted data is received by a front end server and is decrypted with the website's private key(s).

Figure 2:
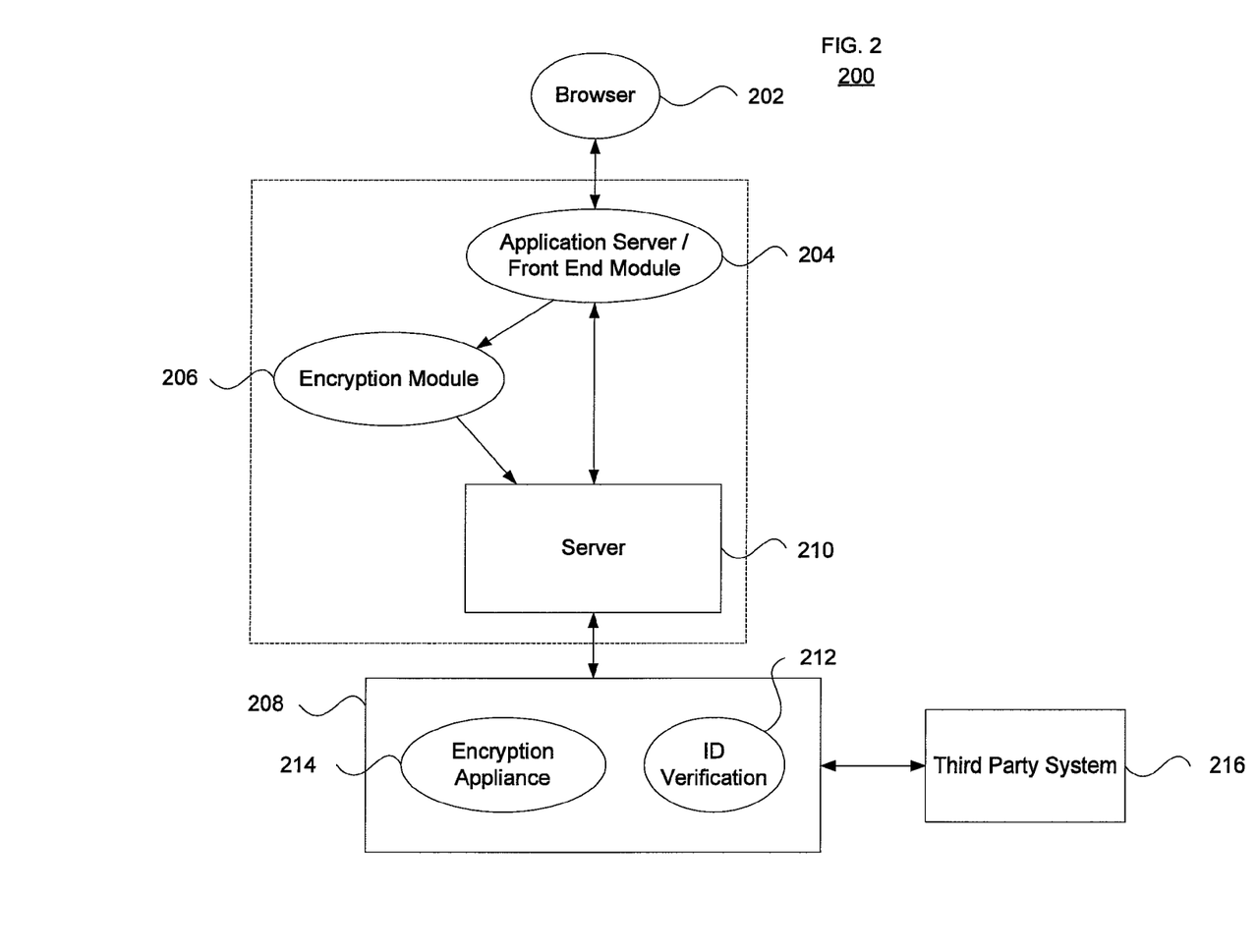
FIG. 2 illustrates a system in accordance with aspects of the invention.

FIG. 2 illustrates an architecture 200 for managing this and other scenarios. The architecture includes a browser 202 of a client device that may be, for example, Google's Chrome browser, Mozilla's Firefox browser, or Microsoft's Internet Explorer browser. As indicated above, the browser 202 communicates with a front end module 204 such as an application server.

In one embodiment, upon receipt of the user's encrypted private data, the front end module 204 provides the private data to an encryption module 206. The encryption module 206 may be part of the application server of the front end module 204 or may be separate therefrom. The encryption module 206 desirably immediately re-encrypts the private data using the public key of a trusted entity, such as trusted entity 208.

The encryption module 206 passes the re-encrypted private data and any other user data to server 210. The server 210 passes this data to ID verification module 212. The server 210 does not log any user information such as name, address or encrypted social security number. The above preserves the user's privacy as the server 210 or any applications or users with access to server 210 are prevented from obtaining the user's private data due to the re-encryption by the encryption module 206.

As shown, the trusted entity 208 is an external system unrelated to the system of the server 210, front end module 204 and encryption module 206. The trusted entity may employ encryption appliance 214 to decrypt the re-encrypted data (e.g., social security number). The user data, including the decrypted social security number, may be submitted to an authorized or otherwise accredited third party system 216 over a secure link. For instance, the accredited third party system may be a credit reporting agency such as Experian. The agency can verify whether the name, address and social security number information match and provide this information to the trusted entity. These results may be relayed to the server 210 via the ID verification module 212. The server 210 then informs the front end module/application server whether the e-mail address or other identifier is associated with a real person.

In an alternative arrangement, the third party system 216 and the trusted entity 208 may be part of a single system or entity. In another configuration, trusted entity 208 may be part of the same system as the server 210, front end module 204 and encryption module 206.

In this case, it may be desirable to save the user's credit card numbers in a secure database such as database 138. This may be done to avoid abuse of the system. For instance, it can be done to deter a user from creating too many accounts (say thousands of accounts) using the same credit card. Here, the trusted entity 208 desirably does not store credit card numbers or other private information to protect users' privacy.

Even storing an SHA2 hash of just the credit card number in a secure database may be undesirable, as it might be possible for a hacker to compromise the database in the future. Though the user's credit card number cannot be reverse computed from the SHA2 hash, a powerful hacker could build a distributed database of hashes on a large cluster of computers to determine which credit card numbers are in the database.

In order to minimize this possibility, a hash (e.g., an SHA2 hash) of multiple pieces of information can be used. Thus, an SHA2 hash of (credit card number, zip code, name) may be employed. It is not feasible to build a database of all strings (credit card number, zip code, name) and find out the name, zip code, or credit card number for a given SHA2_hash. Given the SHA2_hash (credit card number, zip code, name), it is practically impossible to compute or discover the credit card number, zip code and name, without already knowing it. Instead of a credit card number, the following may also be used: SSN (Social Security number), DMV ID (license number), passport Number, or date of birth. The SHA2 hash of such a combination of information may be stored in the secure database.

When someone submits a credit card number, zip code and name for an account, the system looks up if the SHA2 hash, SHA2_hash (CCN, zip code, name) is in the secure database associated with the trusted entity 208. If yes, that user's name already has an email account and someone is trying to create multiple accounts. Since most users and families have multiple email accounts while sharing the same credit card number, the system may allow multiple accounts (e.g., up to a dozen accounts per credit card number per year). In this scenario, the system, would desirably store the e-mail address, SHA2_hash (CCN, zip code, Name) and timestamp in the secure database for this purpose.

One result is that the server 210 and front end module 204 have validation that the user name or other identifier supplied via browser 202 is associated with a real person. This information may be stored in a database accessible to the server 210 and/or the front end module 204. Thus, even though the server and front end module do not maintain any private user data, they can still validate the identity of the user. Such validation of the user may lead to more trust/reliance on postings or other submissions by that user. This may result in better rankings or spam treatment as compared to unverified users.

Thus, when a user from Boston is searching for pizza, an application such as Google Maps will know the location of the user and find verified food businesses in that area. In another situation, an important event may take place at a remote site, and it is hard for services such as Google and YouTube to identity blogs and eye-witness reports from users/bloggers at the scene. For instance, if an earthquake happens in Crescent City, Calif., it would be desirable for a service such as Google News to quickly rank fresh articles from authors in that city higher for a few days. This would enable users to read about the earthquake via firsthand reports from authors in that area. In addition, such firsthand reports or other articles would likely be considered more trustworthy if it is known that the author has been verified. Thus, a verification icon such as "[Verified Name and Location]" could accompany the author's signature line ("by James Pike, Boston")

In yet another example, the validation can be used to identify famous bloggers. For instance, there may be several blogs purportedly by a famous individual, or by different people with the same name. Thus, if there are several blogs associated with George Herman ("Babe") Ruth, the real Babe Ruth can be verified by the state Division of Motor Vehicles ("DMV") in his area. The DMV can also be used to certify Mr. Ruth's company.com email ID and location for disambiguation, and the readers of his blog can be sure that this is "Babe Ruth from the Bronx Bombers, Bronx, N.Y., USA".

According to another aspect of the invention, name verification may also be performed in association with trusted and certified third parties. Here users and web businesses may be certified to one another by a trusted third party such as a state DMV. However, the trusted third party may be any trusted entity that is allowed by law to issue IDs.

In this scenario, users have their private data protected by a trusted third party, and it is guaranteed protection by law. This enables users to move online and offline with the same verified ID. In one example that will be described with regard to FIG. 3, the steps to connect the users and web entities are as follows. First, an initial name verification is conducted between the user and a trusted third party.

Figure 3:
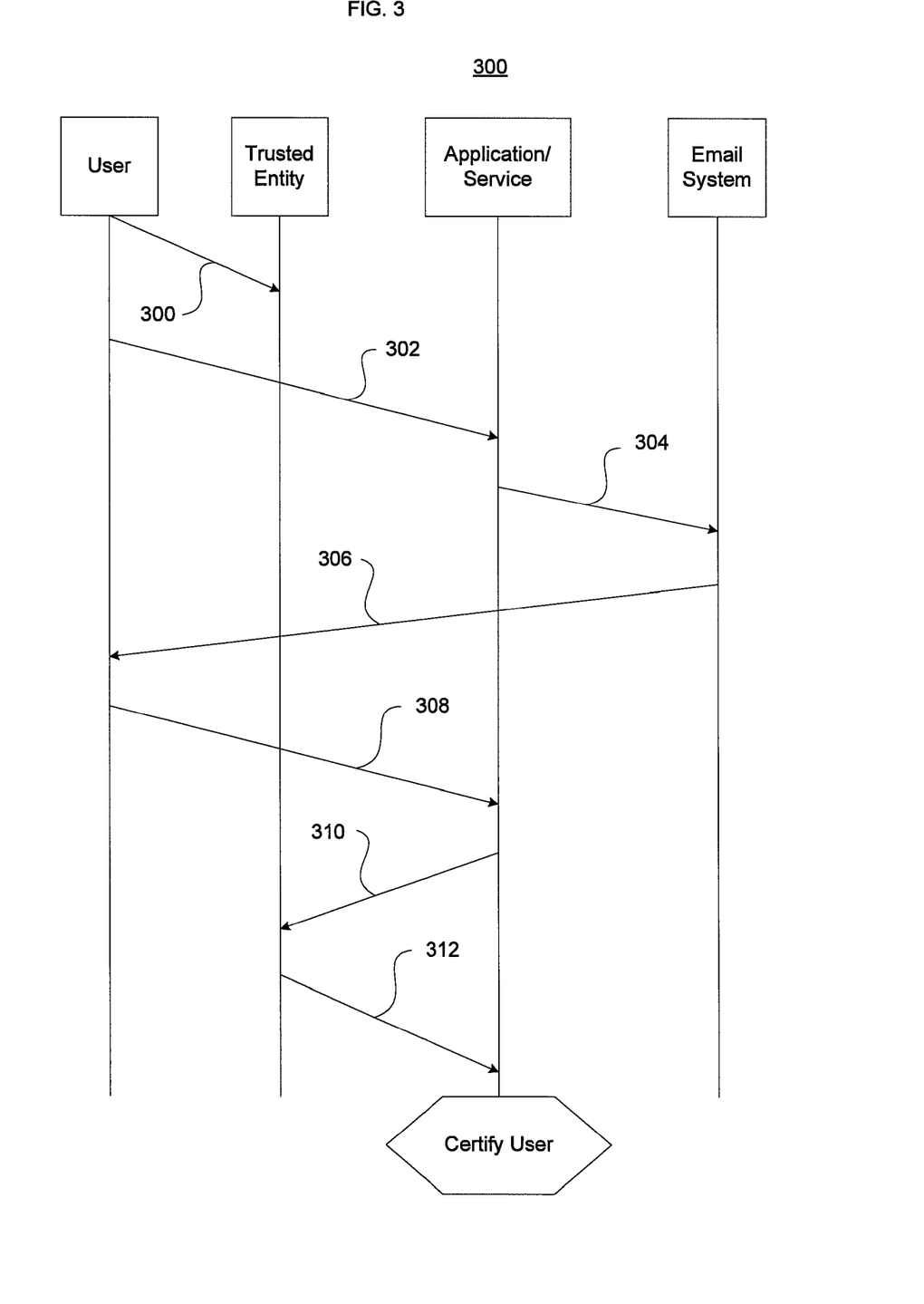
FIG. 3 illustrates a process flow in accordance with aspects of the invention.

For instance, as shown by arrow 300, user "James Pike" visits the DMV. James shows his government issued ID with address (e.g., passport, military ID) to a DMV employee. He informs the employee that his email address is jamespike@nomail.com. The email information is registered by the DMV. The DMV is now able to certify to others that "jamespike@nomail.com" is a verified ID for "James Pike" without revealing other private data about him.

The user "James Pike" may also register his home phone number/cell phone number/work phone with the DMV. This will allow a secure channel between James Pike and the DMV. For instance, the DMV may provide James Pike with a random 10 digit PIN number. James may call DMV's automated system from his phone and enter the DMV pin number. Here, the DMV may use caller ID and sees James' phone number. It checks that the PIN entered is indeed the one assigned to James. This confirms to the DMV that James indeed has access to the phone, and can be reached on that phone. This works to protect against identity theft. Furthermore, both James and the DMV can contact each other using a voice call (or SMS/text/IM message) and periodically check on events to protect against identity theft, stolen passwords, stolen cookies, etc.

The user may interact with the application server 204 and/ or server 210 without those entities asking for private information about the user. In one example, as shown via arrow 302, James logs into an application website such as application.test.com with his email address jamespike@nomail.com. As part of this login process, James may aver that he is a legitimate user named "James Pike" and his official email is jamespike@nomail.com.

As shown by arrow 304, the website sends an email or other communication to "jamespike@nomail.com" with a random 10 digit PIN number that he must enter into the website to prove he is jamespike@nomail.com. The user is also informed about this action. James logs into his email account and, as indicated by arrow 306, retrieves the PIN sent by the website. He then enters the PIN number into an appropriate form on the website as shown by arrow 308. The website checks that the PIN number sent to jamespike@nomail.com was correctly entered.

The user can also receive the PIN over the phone, via SMS, regular postal mail, etc. This has the added advantage that the verifier knows that the user is at that phone number or address. It also allows contact to the user, in case the user is no longer using the verified email ID, but there is fraud happening with that email ID.

Next, James logs into the application website to say that his name and email address (James Pike, jamespike@nomail.com) can be verified by the DMV. The website or its application service provider must pre-register with the DMV. As shown by arrow 310, the application website queries the DMV database as to whether jamespike@nomail.com is a certified email address for James Pike. The DMV will reply to the application website or it's provider's queries. The application website desirably contacts the DMV using HTTPS, which is a secure, encrypted, authenticated channel to avoid spoofing or snooping. For instance, the application website asks the DMV website to confirm that the email address jamespike@nomail.com is associated with James Pike the individual. The DMV knows that to be true because James Pike visited the DMV and registered his email and name with it. Now the application website is able to verify "jamespike@nomail.com" as being an email address for "James Pike" the person. Thus, as shown by arrow 312, the DMV website communicates back to the application server that the email address is associated with the individual. The user and his email address are now certified with the application server.

This certification allows the system to mark any articles or other postings authored by jamespike@nomail.com on the application website with an indicator (e.g., a validation stamp/mark) such as "James Pike—Verified Name", and emails sent by James via the application server are signed by an email application with "sent by verified user: James Pike". Other users know that jamespike@nomail.com is associated with the real person James Pike, providing more trust between users. This can encourage collaboration and exchanges of ideas.

Certain points of this scenario are addressed below. For instance, only the DMV knows private details (social security number, email address, mailing address, etc) about James Pike. The DMV is able to certify James' email ID to businesses/servers registered with the DMV. This may be done, for instance, using either an "opt in" or an "opt out" type of authorization from the user. In addition, the DMV only releases the minimal amount of information necessary for websites to conduct business with users.

Users are not tied to one email address. For instance, if one email ID is compromised, the user can visit the DMV and change their email address issued by any ISP. Here, the DMV is able to verify the user's ID and updates its records.

The DMV may use a "phone channel" to inform James of possible identity theft. For instance, the DMV may make automated phone calls if it has reason to believe James' ID is being misused on the Internet. The DMV periodically checks that James' identity is still safe. James can call the DMV from his home phone to invalidate his email ID if he feels his account has been hacked. The DMV checks the caller ID to confirm that it is James that is calling, and takes appropriate action.

In an alternative, James' address can be checked via postal mail. In this case, if James does not have a phone, the DMV may send a registered letter with a 10 digit PIN to James' address. In this manner, the DMV can ascertain that James' address is accurate in its records. No new private information has to be revealed by James besides what the DMV, post office or telephone company already knows about him. It should be understood that the DMV, post office or telephone company does not have to be a single site. Rather, it can be a network of servers. In this case, each server desirably only certifies names associated with its jurisdiction, or redirect to the server with the correct jurisdiction. In one example, the DMV may charge a micropayment (e.g., $0.10 or $1.00) for verification reports, as this may throttle abusers. The DMV may require that only registered businesses can do lookups.

The DMV can release city level information about users, e.g., that the verified name is James Pike, jamespike@nomail.com, San Jose, Calif. This enables local business to conduct business with James without worrying about him being an remote user to which local laws do not apply. One benefit of this is that it allows local businesses to charge the correct taxes for on-line purchases based on state tax rates.

Since James Pike's ID does not depend on his email ID, the email service (e.g., gmail) can issue multiple temporary email IDs to James and sign them with the email service's signature. That is, "<jame.templ@nomail.com> James Pike" signed by Google's gmail server as being verified.

In addition, according to another aspect of the invention, email addresses can be recycled like physical addresses as long as there is a secure chain of verification links (e.g., DMV to email service to business). Also, the DMV does not have to run its own email servers. Rather, the DMV certifies users and businesses to one another securely. Furthermore, the trusted entity such as the DMV can be any other entity that users and businesses trust to hold private information that is protected by federal laws, like the US Postal Service, as using a false address and making affirmative misrepresentations can be covered by applicable law.

In accordance with another aspect of the invention, name verification may be provided by endorsements. For instance, verified users can endorse other users they know or work with. Since many remote users may not have a valid ID verified by a local organization, other locally verified users can endorse them with some certainty. This allows an application server to develop a large global membership of "verified authors".

In one process, user "James Pike jamespike@nomail.com" connects to an application server via his browser and verifies himself on the application server using one of the available name verification methods. For instance, if James teaches at a community college, he may interact with his students via email. James knows the students by their names (as registered with the community college) and email address.

The students log in to the application server with their email ID. For instance, "Ann Smith" annsmith@nomail.com logs into the application server and enters "jamespike@nomail.com" to verify her ID. She may inform James in person or otherwise that she wants her ID annsmith@nomail.com to be endorsed by James.

James logs onto the application server and sees that he has a message to verify one of his students, namely "Ann Smith annsmith@nomail.com". Desirably, the system provides him with several choices while endorsing annsmith@nomail.com. In one example, he picks the strongest endorsement, which may be: I know Ann Smith annsmith@nomail.com officially and interacted with her personally, and her ID has been verified by a common authority (the community college).

Probabilities may be assigned to the users. The probabilities represent how trusted the information is. In one example, 1.0 means that there is no doubt about the verified name. It allows the system to compute with multiple probabilities. In this scenario, the application server may assigned a given probability P1 to James Pike. P1 may be almost 1.0 (e.g., 0.97) on a scale of 0.0 to 1.0. The application server may assign a second probability P2 that annsmith@nomail.com is Ann Smith, were P2 is slightly less than P1 (e.g., 0.95). The administrator for the application server may set the trust threshold equal to 0.95, so if P>=0.95, it will show the "Verified Name" icon. The threshold may vary depending upon system criteria and metrics.

Now, students can certify each other with probabilities for their friends' real names and application IDs. For instance, Student1 and Student2 may certify student3 with probabilities P1, and P2 that student3 is "John Rake johnrake@nomail.com". Assume that the application server knows Student1 with probability S1, and Student2 with probability S2. The application server may determine the probability P3 of student3's verified name, which may be found according to the equation $P3=1-(1-S1*P1)(1-S2*P2)$. As more and more trusted people certify student3 (John Rake), the probability of his name being correct also gets closer to 1.

As more people endorse new users, the application server's confidence in their real name increases. Besides manual endorsements, the system may compute implicit endorsements of users based on their interactions on the application server. This may include, e.g., co-authors who work together on collaborative articles or authors who share the same network address and geolocation.

Another aspect of the invention deals with revocations of endorsements. Revocations (or negative endorsements) allow users to inform the application server of other users whose IDs have been compromised. For instance, users may revoke their endorsements based on newer data. In one example, a professor may revoke all the endorsements of student IDS once the semester is over. Thus, Ann may revoke her endorsement of her friend "John" Rake" once she starts receiving spam from him, which may occur if his account has been compromised by spammers. In this case, the newer revocation/negative endorsement overrides any earlier endorsement. Notably, it is not that "John Rake" may not be a true ID; rather, it is just that Ann won't certify him anymore.

In one scenario, the chain of revocations may be as follows. If "jamespike@nomail.com" is comprised, the whole chain of endorsements is considered compromised. In this scenario, the endorsement procedure is desirably rerun on the data while ignoring all links between compromised users.

The set of users can be treated as a directed graph, with each user i as a node $U\_i$, and each edge from user i to user j as $e\_{ij}$ with weight $p\_{ij}$. $p\_{ij}$ indicates the trust user i has in the ID of user j. In one scenario, the DMV would also represent nodes in the graph, which are treated like "oracles." An iterative algorithm, similar to Google's page rank, can be used to compute the trust worthiness of the names of users in the graph. For instance, each $u\_i$ certified by the DMV may be assigned a weight $w\_i=1$. The stability of the algorithm depends on the fact all $w\_i$ are monotonically increasing, as more information flows from other users. Desirably, this process is rerun cyclically, e.g., every day, as new information comes and old information is discarded (revoked).

In another scenario, name disambiguation may be performed by location. Knowing the approximate location of the user can be fundamental to trust on the web. For instance, there may be hundreds of James Pikes in the world. In one example, an email from a verified James Pike in Russia to someone in Boston is less trustworthy than an email from a verified James Pike in Boston.

In this case, the application or service shows James's zipcode/localities to recipients of James email, for instance as "verified James Pike of Boston". This immediately increases trust with the sender. It means the application or service has verified both the name and location (e.g., via the Massachusetts DMV) of the sender.

Similarly, local businesses can get their domains and static IP addresses certified by the local DMV. The steps are similar for user name verification, but businesses may have their static IP addresses and domain name also certified by the DMV or equivalent entity. For example, Company1 may file a form with the DMV asserting it is the owner of company1.com and also owns static IP address 1.2.3.4. All mail from users@company1.com and sent out from mail servers on that static IP address is considered to be from company1.com. The DMV may charge some fees to certify these online verifications. Such verifications do not have to be done for every piece of email; rather a service such as Google's Gmail may contact the DMV once to verify the identity of company1.com. Then Gmail may treat any emails from company1.com as legitimate and have an easier time identifying spam. A key result is that the local business and customers can interact in a trusted manner.

Another scenario applies to local business and certified advertising. Presently, all unsolicited email from businesses may be treated uniformly as either spam or not spam. It is possible to re-rank emails from local users to each other as more useful. So a pizza shop, instead of spamming millions of users and spoiling its email reputation, can instead target users in its locality.

In one example, the DMV or post office can collect fees or taxes from local businesses, combine their mails into circulars and sign them before sending it local users. This has many advantages. First, all such emails are trusted emails, so there is no need for the email application or other service to look for spammers in this set of emails. Also, users may get a limited amount of advertisements so it is more likely that they will actually read them. Another benefit is that users will get useful advertisements such as coupons. In addition, the post office may generate revenue from managing the emails. The system allows users to report bad businesses, either to the application/service or the post office. The application or service can re-rank businesses more effectively, similar to Google's page rank feature, but focused on local user ratings. In addition, the post office can apply local laws and prohibit certain ads or banned substances depending on local laws.

In another scenario, re-rankings may be performed for local star ratings and reviews based upon user verification. Ratings such as star ratings for businesses are occasionally spammed by fake users, who write good or bad reviews of businesses. Due to such practices, readers may have no way of knowing how much value a rating has. For example, users 1 to 10 may say "pizza is best in this store" and give it a 5 star (highest) rating. According to aspects of the invention, a service such as a search engine will then give higher weight to verified users in the same area as the store. Readers can also see what local residents have to say about a business. Readers may look for a spread in the ratings, for instance to determine if all the ratings are coming from the same house or address.

According to another aspect, certified coupons may be provided. Currently, Internet-based coupons may be quickly and easily duplicated. Local businesses like to offer discounts to many users, this can be problematic if users quickly share the discount codes and the offer is cornered by a few users. The business may lose money on the coupons without reaching all of their target audience. In this case, verified names can be used to enhance directed advertising.

In one example, the business would first create a list of users in its local area that it wants to offer discount to. The business signs each promotion <coupon, serial number, intended user ID>. The coupons are desirably configured for one time use and are not transferable. The business has its circular signed by the post office or equivalent entity for a small charge. The post office ensures that the offer is legitimate, and makes sure the consumers are not overloaded with too many offers, as too many ads in email may be considered spam and the consumer will not read any of them. The business sends out the coupons or otherwise provides them to intended recipients. A specialized aggregator can do this for all the businesses in the area. The recipient sees a verified coupon circular in mail, and they are assured such are legitimate. The businesses are also assured only genuine customers are receiving the discounts.

In a further scenario, parents can opt with a service provider to enable their child's account to receive/send emails only with verified users/businesses in that locality. The parents can endorse their child's email IDs; in this case, the child's email can include extra safety features. For example, the child is never exposed to spam or emails from strangers. In an alternative, parents and teachers can endorse users who interact with each other in a trusted manner. Such endorsed or trusted user need not all be on the same email system. Instead, they can use different email hosts/servers, yet once their IDs are verified, they can all interact in a trusted forum for study discussions, chat groups, etc.

Furthermore, while certain processes in accordance with aspects of the invention are shown in the figures as occurring in a linear fashion, this is not a requirement unless expressly stated herein. Different processes may be performed in a different order or concurrently.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for maintaining user privacy in a verification system, the method comprising:
    receiving encrypted private data of a user from a client device;
    re-encrypting the encrypted private data with an encryption module using a public key of a trusted entity;
    sending the re-encrypted private data and selected user data to an ID verification module without logging personal information of the user;
    storing a hash of multiple pieces of user-related information in a secure database, the user-related information including at one or more components of both the private data and the selected user data;
    receiving validation from the ID verification module that the user has been verified;
    storing the validation in a database so that actions taken by the user are indicated as being done by the user;
    receiving account information associated with the user;
    comparing the received account information with the hash in the secure database; and
    determining whether a new account can be created based upon the comparison.

2. The method of claim 1, wherein determining whether the new account can be created includes determining whether multiple accounts are already associated with the account information, and wherein it is determined that the new account cannot be created if the multiple accounts exceed a threshold amount.

3. The method of claim 1, wherein
    the selected user data includes a telephone number, and the method further comprises providing a PIN number to the user for creating a secure channel between the user and the trusted entity, whereby the PIN is usable to confirm that the telephone number is associated with the user.

4. The method of claim 1, wherein the selected user data includes an address, and the method further comprises sending a PIN number to the user at the address for creating a secure channel between the user and the trusted entity, whereby the PIN is usable to confirm that the address is associated with the user.

5. A method for maintaining user privacy in a verification system, the method comprising:
    receiving encrypted private data of a user from a client device;
    re-encrypting the encrypted private data with an encryption module using a public key of a trusted entity;
    sending the re-encrypted private data and selected user data to an ID verification module without logging personal information of the user;
    receiving validation from the ID verification module that the user has been verified;
    storing the validation in a database so that actions taken by the user are indicated as being done by the user;
    receiving a given action associated with the user;
    determining whether the user has been validated by evaluating the stored validation; and
    upon determining that the user has been validated, identifying to a third party that the given action is associated with the user, wherein the third party is associated with a geographical area, and the identifying to the third party includes presenting the given action of the user to the third party if the user is also associated with the geographical area.

6. The method of claim 5, wherein the user is a business entity and the given action is an advertisement, coupon or accolade for the business entity.

7. The method of claim 4, wherein the identification is a validation mark presented on a display device.

8. A method for maintaining user privacy in a verification system, the method comprising:
    receiving encrypted private data of a user from a client device;
    re-encrypting the encrypted private data with an encryption module using a public key of a trusted entity;
    sending the re-encrypted private data and selected user data to an ID verification module without logging personal information of the user;
    receiving validation from the ID verification module that the user has been verified;
    storing the validation in a database so that actions taken by the user are indicated as being done by the user;
    receiving a given action associated with the user;
    determining whether the user has been validated by evaluating the stored validation; and
    upon determining that the user has been validated, identifying to a third party that the given action is associated with the user, wherein the user is a plurality of users, and the given action associated with each user includes information about a geographical area, the method further comprising ranking results from the users based on their respective relation to the geographical area.

9. A method for maintaining user privacy in a verification system, the method comprising:
    receiving encrypted private data of a user from a client device;
    re-encrypting the encrypted private data with an encryption module using a public key of a trusted entity;
    sending the re-encrypted private data and selected user data to an ID verification module without logging personal information of the user;
    receiving validation from the ID verification module that the user has been verified;
    storing the validation in a database so that actions taken by the user are indicated as being done by the user;
    receiving a given action associated with the user;
    determining whether the user has been validated by evaluating the stored validation; and
    upon determining that the user has been validated, identifying to a third party that the given action is associated with the user, wherein the given action is a web posting and at least one component of the selected user data comprises a location of the user.

10. A method for maintaining user privacy in a verification system, the method comprising:
    receiving encrypted private data of a user from a client device;
    re-encrypting the encrypted private data with an encryption module using a public key of a trusted entity;

sending the re-encrypted private data and selected user data to an ID verification module without logging personal information of the user;
receiving validation from the ID verification module that the user has been verified;
storing the validation in a database so that actions taken by the user are indicated as being done by the user;
receiving an endorsement from a second user, the second user having received a separate validation from the ID verification module; and
using the endorsement to verify an identity of the user.

11. A method for maintaining user privacy in a verification system, the method comprising:
receiving encrypted private data of a user from a client device;
re-encrypting the encrypted private data with an encryption module using a public key of a trusted entity;
sending the re-encrypted private data and selected user data to an ID verification module without logging personal information of the user;
receiving validation from the ID verification module that the user has been verified;
storing the validation in a database so that actions taken by the user are indicated as being done by the user;
receiving an endorsement from a second user, the second user having received a separate validation from the ID verification module; and
using the endorsement to place content restrictions on information provided to the user.

12. A system for maintaining user privacy in a network, the system comprising:
receiver means for receiving encrypted private data of a user from a client device;
a processor including an encryption module for re-encrypting the encrypted private data using a public key of a trusted entity; and
a transmitter for sending the re-encrypted private data and selected user data to an ID verification module without logging personal information of the user;
wherein the processor is configured to receive validation from the ID verification module that the user has been verified and store the validation in a database so that actions taken by the user are indicated as being done by the user;
wherein the processor is further configured to store a hash of multiple pieces of user-related information in a secure database, the user-related information including at one or more components of both the private data and the selected user data; and
wherein the processor is further configured to:
receive account information associated with the user;
compare the received account information with the hash in the secure database; and
determine whether a new account can be created based upon the comparison.

13. The system of claim 12, wherein the selected user data includes a telephone number, and the system is configured to provide a PIN number to the user for creating a secure channel between the user and the trusted entity, whereby the PIN is usable to confirm that the telephone number is associated with the user.

14. The system of claim 12, wherein the selected user data includes an address, and the system is configured to send a PIN number to the user at the address for creating a secure channel between the user and the trusted entity, whereby the PIN is usable to confirm that the address is associated with the user.

15. A system for maintaining user privacy in a network, the system comprising:
receiver means for receiving encrypted private data of a user from a client device;
a processor including an encryption module for re-encrypting the encrypted private data using a public key of a trusted entity; and
a transmitter for sending the re-encrypted private data and selected user data to an ID verification module without logging personal information of the user;
wherein the processor is configured to receive validation from the ID verification module that the user has been verified and store the validation in a database so that actions taken by the user are indicated as being done by the user;
wherein the processor is further configured to:
receive a given action associated with the user;
determine whether the user has been validated by evaluating the stored validation; and
upon determining that the user has been validated, identify to a third party that the given action is associated with the user; and
wherein the third party is associated with a geographical area, and the identifying to the third party includes presenting the given action of the user to the third party if the user is also associated with the geographical area.

16. A system for maintaining user privacy in a network, the system comprising:
receiver means for receiving encrypted private data of a user from a client device;
a processor including an encryption module for re-encrypting the encrypted private data using a public key of a trusted entity; and
a transmitter for sending the re-encrypted private data and selected user data to an ID verification module without logging personal information of the user;
wherein the processor is configured to receive validation from the ID verification module that the user has been verified and store the validation in a database so that actions taken by the user are indicated as being done by the user; and
wherein the processor is further configured to:
receive an endorsement from a second user, the second user having received a separate validation from the ID verification module; and
use the endorsement to verify an identity of the user.

17. A system for maintaining user privacy in a network, the system comprising:
receiver means for receiving encrypted private data of a user from a client device;
a processor including an encryption module for re-encrypting the encrypted private data using a public key of a trusted entity; and
a transmitter for sending the re-encrypted private data and selected user data to an ID verification module without logging personal information of the user;
wherein the processor is configured to receive validation from the ID verification module that the user has been verified and store the validation in a database so that actions taken by the user are indicated as being done by the user; and
wherein the processor is further configured to:
receive an endorsement from a second user, the second user having received a separate validation from the ID verification module; and
use the endorsement to place content restrictions on information provided to the user.

* * * * *

UNITED STATES PATENT AND TRADEMARK OFFICE
CERTIFICATE OF CORRECTION

| | | |
|---|---|---|
| PATENT NO. | : 8,347,093 B1 | Page 1 of 1 |
| APPLICATION NO. | : 12/838841 | |
| DATED | : January 1, 2013 | |
| INVENTOR(S) | : Mohsin Ahmed | |

It is certified that error appears in the above-identified patent and that said Letters Patent is hereby corrected as shown below:

In the Claims:

Column 14, line 18, "4" should read -- 5 --.

Signed and Sealed this
Sixteenth Day of September, 2014

Michelle K. Lee
*Deputy Director of the United States Patent and Trademark Office*